US012732375B2

(12) United States Patent
Matsubara

(10) Patent No.: US 12,732,375 B2
(45) Date of Patent: Sep. 8, 2026

(54) METHOD AND PROGRAM

(71) Applicant: MRS HOLDINGS CO., LTD., Tokyo (JP)

(72) Inventor: Takashi Matsubara, Tokyo (JP)

(73) Assignee: MRS HOLDINGS CO., LTD., Tokyo (JP)

( * ) Notice: Subject to any disclaimer, the term of this patent is extended or adjusted under 35 U.S.C. 154(b) by 167 days.

(21) Appl. No.: 18/260,474

(22) PCT Filed: Jan. 6, 2022

(86) PCT No.: PCT/JP2022/000284
§ 371 (c)(1),
(2) Date: Jul. 27, 2023

(87) PCT Pub. No.: WO2022/149604
PCT Pub. Date: Jul. 14, 2022

(65) Prior Publication Data

US 2024/0056308 A1 Feb. 15, 2024

(30) Foreign Application Priority Data

Jan. 8, 2021 (JP) ................................ 2021-002371

(51) Int. Cl.
*H04L 29/06* (2006.01)
*H04L 9/00* (2022.01)
*H04L 9/32* (2006.01)

(52) U.S. Cl.
CPC .............. *H04L 9/3236* (2013.01); *H04L 9/50* (2022.05)

(58) Field of Classification Search
CPC ......... H04L 9/3236; H04L 9/50; H04L 63/12; H04L 2209/08; G06F 21/64
See application file for complete search history.

(56) References Cited

U.S. PATENT DOCUMENTS

2005/0084832 A1 4/2005 Janssen et al.
2019/0305968 A1 10/2019 Versteeg et al.
(Continued)

FOREIGN PATENT DOCUMENTS

EP 2763070 B1 3/2017
JP 2019117555 A 7/2019
WO 03053245 A2 7/2003

OTHER PUBLICATIONS

Nov. 21, 2024, the Extended European Search Report issued by the European Patent Office in the corresponding European Patent Application No. 22736772.9.
(Continued)

*Primary Examiner* — Shin-Hon (Eric) Chen
*Assistant Examiner* — Vladimir I Gavrilenko
(74) *Attorney, Agent, or Firm* — KENJA IP LAW PC

(57) ABSTRACT

A method for generating a candidate nonce value for acquiring a hash value of a block coupled to a blockchain includes: executing one or more times, by a terminal apparatus functioning as a node in a blockchain network, a specific process including an acquisition step of acquiring a plurality of candidate nonce information, an assignment step of assigning a different value to each of two or more candidate nonce information among the plurality of candidate nonce information, an output step of outputting the two or more candidate nonce information in a manner the user can recognize, and a storing step of storing a value assigned to one candidate nonce information selected from the two or more candidate nonce information based on a user operation; and generating one candidate nonce value using one or more values stored as a result of the specific process having been executed one or more times.

4 Claims, 11 Drawing Sheets

(56) References Cited

U.S. PATENT DOCUMENTS

| | | | | |
|---|---|---|---|---|
| 2020/0082101 | A1* | 3/2020 | Kim | G06F 21/73 |
| 2020/0143338 | A1* | 5/2020 | Lucidarme | G06Q 50/06 |
| 2021/0058231 | A1* | 2/2021 | Nogayama | G06Q 20/3827 |
| 2021/0160222 | A1* | 5/2021 | Bartolucci | H04L 9/3247 |
| 2021/0201409 | A1* | 7/2021 | Hoshizuki | H04L 9/3239 |
| 2021/0226773 | A1* | 7/2021 | Snow | H04L 9/0869 |
| 2024/0257147 | A1* | 8/2024 | Owen | G06Q 30/0185 |

OTHER PUBLICATIONS

Jul. 4, 2023, International Preliminary Report on Patentability issued in the International Patent Application No. PCT/JP2022/000284.

Mar. 22, 2022, International Search Report issued in the International Patent Application No. PCT/JP2022/000284.

Jun. 15, 2025, Office Action issued by the Korean Intellectual Property Office in the corresponding Korean Patent Application No. 10-2023-7026663.

Mar. 21, 2025, Office Action issued by the Directorate General of Intellectual Property in the corresponding Indonesian Patent Application No. P00202307118.

Nov. 25, 2025, Office Action issued by the China National Intellectual Property Administration in the corresponding Chinese Patent Application No. 202280009254.2.

Apr. 30, 2026, Office Action issued by the China National Intellectual Property Administration in the corresponding Chinese Patent Application No. 202280009254.2.

* cited by examiner

FIG. 5

| CANDIDATE NONCE INFORMATION | | | | | | | | |
|---|---|---|---|---|---|---|---|---|
| NAME | 0 | 1 | 2 | 3 | 4 | 5 | 6 | 7 |
| VALUE | null | null | 3 | 7 | null | 0 | 9 | 1 |
| ORDER | null | null | 10 | 8 | null | 4 | 9 | 6 |

| CANDIDATE NONCE INFORMATION | | | | | | | | |
|---|---|---|---|---|---|---|---|---|
| NAME | 8 | 9 | a | b | c | d | e | f |
| VALUE | 5 | 8 | 2 | null | 4 | null | 6 | null |
| ORDER | 2 | 7 | 5 | null | 1 | null | 3 | null |

FIG. 11

| TIME | FIFTH TIME | FOURTH TIME | THIRD TIME | SECOND TIME | FIRST TIME |
|---|---|---|---|---|---|
| PHASE | e69950d7c468f5127343 | a69150d3c76534592842 | e69950d7c468f5127341 | 69e65093c441f512d708 | c485e650a27198376923 |
| NAME | 4 | d | e | 0 | e |
| VALUE | 3 | 3 | 6 | 8 | 6 |
| ORDER | 10 | 4 | 1 | 10 | 3 |
| SELECTED VALUE | 10&43 | 04&d3 | 01&e6 | 10&08 | 03&e6 |

METHOD AND PROGRAM

CROSS REFERENCE TO RELATED APPLICATION

This application claims priority to and the benefit of Japanese Patent Application No. 2021-002371 filed on Jan. 8, 2021, the entire contents of which are incorporated herein by reference.

TECHNICAL FIELD

The present disclosure relates to a method and a program.

BACKGROUND

Conventionally, technologies related to a blockchain are known. For example, PTL 1 discloses a technology that causes a user terminal accessing a website to execute mining of a virtual currency whose transaction information is managed using the blockchain.

CITATION LIST

Patent Literature

PTL 1: JP2019-117555A

SUMMARY

Technical Problem

There has been room for improvement in the technology related to the blockchain.

An object of the present disclosure in view of such a condition is to improve the technology related to the blockchain.

Solution to Problem

A method according to an embodiment of the present disclosure is a method for generating a candidate nonce value for acquiring a hash value of a block coupled to a blockchain, the method comprising:

executing one or more times, by a terminal apparatus functioning as a node in a blockchain network, a specific process including
- an acquisition step of acquiring a plurality of candidate nonce information, each of which can be distinguished by a user,
- an assignment step of assigning a different value to each of two or more candidate nonce information among the plurality of candidate nonce information,
- an output step of outputting the two or more candidate nonce information in a manner the user can recognize, and
- a storing step of storing a value assigned to one candidate nonce information selected from the two or more candidate nonce information based on a user operation; and generating one candidate nonce value using one or more values stored as a result of the specific process having been executed one or more times.

A method according to an embodiment of the present disclosure is a method for generating a candidate nonce value for acquiring a hash value of a block coupled to a blockchain, the method comprising:

executing one or more times, by a terminal apparatus functioning as a node in a blockchain network, a specific process including
- an acquisition step of acquiring a plurality of candidate nonce information, each of which can be distinguished by a user,
- an assignment step of assigning a different value to each of two or more candidate nonce information among the plurality of candidate nonce information,
- an output step of outputting the two or more candidate nonce information in a manner the user can recognize, and
- a storing step of storing, when one candidate nonce information is selected from the two or more candidate nonce information, a value assigned to the one candidate nonce information; and generating one candidate nonce value using one or more values stored as a result of the specific process having been executed one or more times.

A program according to an embodiment of the present disclosure is a program for generating a candidate nonce value for acquiring a hash value of a block coupled to a blockchain, the program comprising:

causing a computer functioning as a node in a blockchain network to:
- execute, one or more times, a specific process including
  - an acquisition step of acquiring a plurality of candidate nonce information, each of which can be distinguished by a user,
  - an assignment step of assigning a different value to each of two or more candidate nonce information among the plurality of candidate nonce information,
  - an output step of outputting the two or more candidate nonce information in a manner the user can recognize,
  - a step of causing selection of one candidate nonce information from the two or more candidate nonce information, and
  - a storing step of storing a value assigned to the one candidate nonce information; and
- generate one candidate nonce value using one or more values stored as a result of the specific process having been executed one or more times.

Advantageous Effect

According to the embodiment of the present disclosure, a technology related to the blockchain is improved.

BRIEF DESCRIPTION OF THE DRAWINGS

In the accompanying drawings:

FIG. 5 is a diagram illustrating examples of parameters assigned to each of a plurality of candidate nonce information;

FIG. 11 is a diagram illustrating an example of information stored as a result of a specific process having been executed five times.

DETAILED DESCRIPTION

Hereinafter, an embodiment of the present disclosure will be described.

(Summary of the Embodiment)

Figure 1:
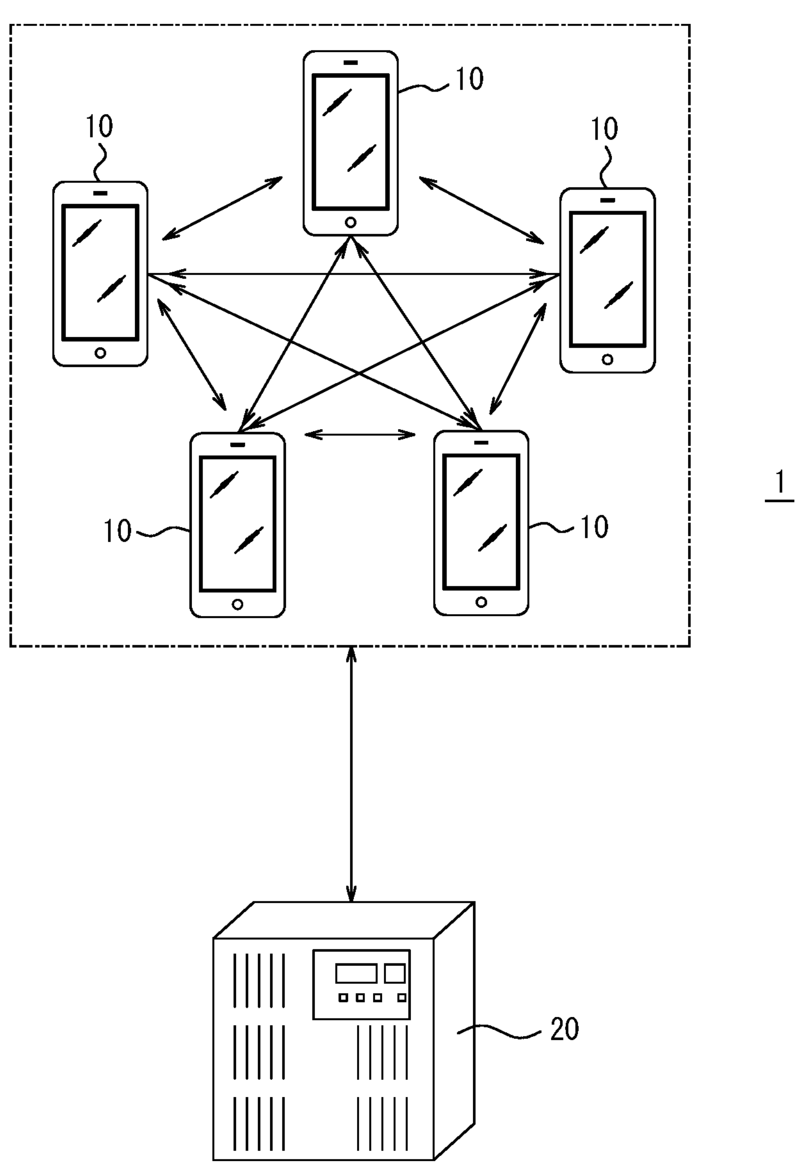
FIG. 1 is a block diagram illustrating a schematic configuration of a system according to an embodiment of the present disclosure.

An overview of a system 1 according to the embodiment of the present disclosure will be described referring to FIG. 1. The system 1 includes a plurality of terminal apparatuses 10 and a server 20. Each of the terminal apparatuses 10 and the server 20 can communicate with each other via a network including, for example, a mobile communication network and the Internet.

The terminal apparatuses 10 are any computers that can be used by a user. For example, a smartphone, a tablet computer or a PC (Personal Computer) can be used as the terminal apparatuses 10. Although five terminal apparatuses 10 are illustrated in FIG. 1, the number of the terminal apparatuses of the system 1 may be two or more. The server 20 is configured to include one or more computers.

A consortium-type blockchain is used in the present embodiment. Each of the terminal apparatuses 10 functions as a node in a blockchain network. For example, each of the terminal apparatuses 10 accesses the server 20 and executes a login process. The server 20 stores an IP address of each of the terminal apparatuses 10 that has been given login permission. The terminal apparatuses 10 that have been given the login permission are connected to one another via a P2P (Peer-to-peer) communication. Each of the terminal apparatuses 10 stores blockchain data in at least one of a storage on its own device and a cloud storage.

In order to link a new block to the blockchain, it is necessary to find a correct nonce such that a hash value of the new block meets a criterion for the mining difficulty, i.e., to achieve successful mining. Conventionally, a hash rate of a computer performing mining depends on computing power thereof. For this reason, operators participating in mining generally install expensive computers with high computing power and mechanically repeat determination and verification of a candidate nonce value. In addition, as the hash rate of the entire blockchain increases, it is common practice to increase the mining difficulty to maintain the hash rate at a given target value. Thus, there has been a problem that individuals using, for example, computers with relatively low computing power have difficulty in participating in mining. There is another problem that the mining difficulty of the blockchain is increased to the extent that it becomes practically impossible to find the correct nonce and, as a result, a hard fork of the blockchain has to be implemented. As such, the present embodiment improves a technology related to the blockchain by solving these problems.

Here, an overview of the present embodiment will be described, leaving a detailed description thereof to be discussed later. The terminal apparatus serving as the node in the blockchain network executes a process (hereinafter, also referred to as a "specific process") including an acquisition step, an assignment step, an output step and a storing step one or more times.

In the acquisition step, the terminal apparatus 10 acquires a plurality of candidate nonce information, each of which can be distinguished by a user. For example, the plurality of candidate nonce information can be respective image information of cards with different pictures (i.e., user-distinguishable images).

In the assignment step, the terminal apparatus 10 assigns a different value to each of two or more candidate nonce information among the plurality of candidate nonce information. The value assigned to each candidate nonce information may be concealed from the user. In this case, for example, although a value indicated by an integer between 0 and 9 may be assigned to each candidate nonce information, the user cannot identify the value assigned to each candidate nonce information.

In the output step, the terminal apparatus 10 outputs the two or more candidate nonce information in a manner the user can recognize. For example, images of the cards with different pictures representing the two or more candidate nonce information can be output on a display of the terminal apparatus 10.

In the storing step, the terminal apparatus 10 stores a value assigned to one candidate nonce information selected from the two or more candidate nonce information based on a user operation. For example, a value indicated by an integer between 0 and 9 assigned to the selected one candidate nonce information can be stored.

The terminal apparatus 10 generates one candidate nonce value using one or more values stored as a result of the specific process having been executed one or more times. For example, in a case in which the specific process is executed five times, five values respectively represented by an integer between 0 and 9 can be stored. Then, a five-digit candidate nonce value can be generated by aligning these five values.

In the present embodiment, as described above, the candidate nonce value is determined using the value assigned to the candidate nonce information selected from the two or more candidate nonce information based on the user operation. In this configuration, since a user operation to select the candidate nonce information is required for the determination of the candidate nonce value, the hash rate of the terminal apparatus 10 is independent of its computing power. Thus, individuals using, for example, computers with relatively low computing power can easily participate in mining, whereby the technology related to the blockchain is improved.

In the present embodiment, further, the value assigned to each candidate nonce information is concealed from the user. This configuration inhibits the user from arbitrary selecting candidate nonce information to which a desired value is assigned and, as a result, prevents an arbitrary input of a desired candidate nonce value from the terminal apparatus 10. Therefore, a fraudulent act in which, for example, a business operator quickly finds a correct nonce by using a computer with high computing power prepared separately from the terminal apparatus 10 and inputs the correct nonce from the terminal apparatus 10 can be prevented, whereby the technology related to blockchain is further improved.

Next, a configuration of each element of the system 1 will be described in detail.

(Configuration of Terminal Apparatus)

Figure 2:
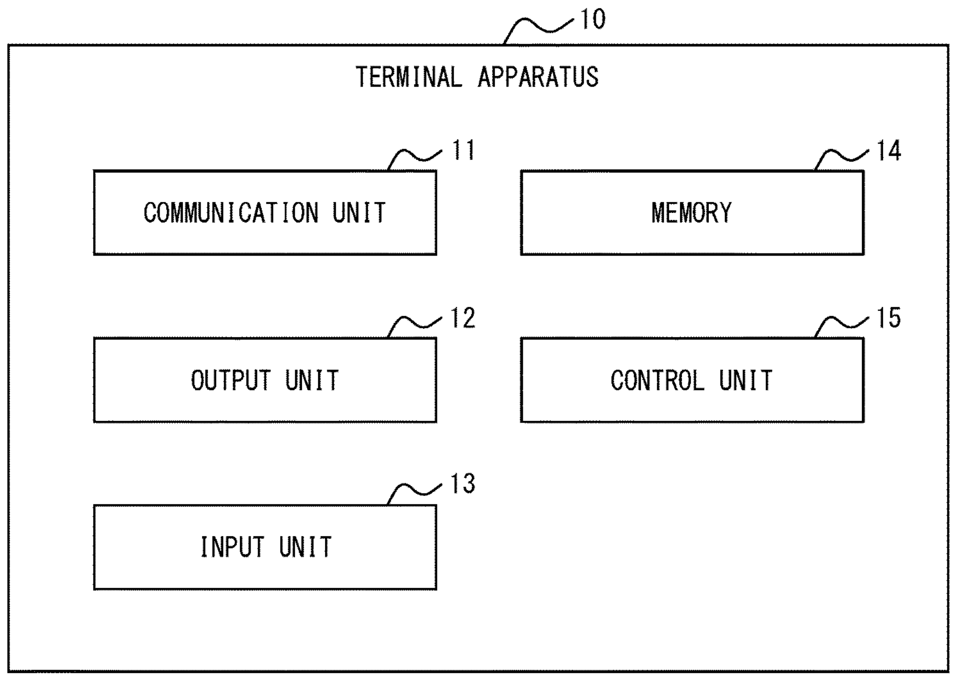
FIG. 2 is a block diagram illustrating a schematic configuration of a terminal apparatus.

The terminal apparatus 10 includes a communication unit 11, an output unit 12, an input unit 13, a memory 14 and a control unit 15, as illustrated in FIG. 2.

The communication unit 11 includes one or more communication interfaces configured to communicate via a network including, for example, the Internet. The communication interfaces may be compatible with any communication standards including, but are not limited to, mobile communication standards such as 4G (4th Generation) and 5G (5th Generation), a wired LAN (Local Area Network) standard and a wireless LAN standard. In the present embodiment, the terminal apparatus 10 communicates with the server 20 and other terminal apparatuses 10 via the communication unit 11.

The output unit 12 includes one or more output devices configured to output information in a manner the user can recognize. The output device may be, but is not limited to, a display configured to output information in the form of an image, a speaker configured to output information in the form of a sound, or a vibrator configured to output information in the form of a vibration.

The input unit 13 includes one or more input devices configured to detect a user operation. The input device may be, but is not limited to, a mechanical key, a capacitive key, a touchscreen-integrated display of the output unit 12, a microphone configured to receive a voice input, or a camera.

The memory 14 includes one or more memories. The memory may be, but is not limited to, a semiconductor memory, a magnetic memory or an optical memory. Each memory included in the memory 14 may function as, for example, a main memory, an auxiliary memory or a cache memory. The memory 14 stores any information used in an operation of the terminal apparatus 10. For example, the memory 14 may store a system program and an application program.

The control unit 15 includes one or more processors, one or more programmable circuits, one or more specialized circuits, or a combination thereof. The processor may be, but is not limited to, a general-purpose processor such as CPU (Central Processing Unit) and GPU (Graphics Processing Unit) or a specialized processor dedicated for particular processing. The programmable circuit is, but is not limited to, FPGA (Field-Programmable Gate Array). The specialized circuit is, but is not limited to, ASICs (Application Specific Integrated Circuit). The control unit 15 controls the operation of the terminal apparatus 10 in its entirety.

(Configuration of Server)

Figure 3:
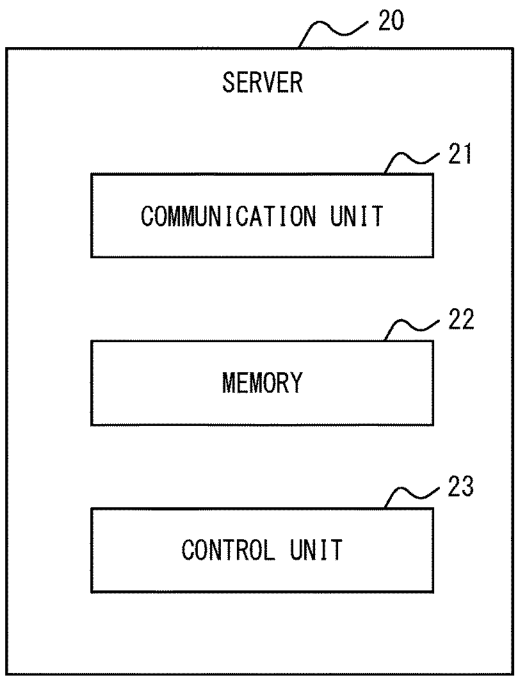
FIG. 3 is a block diagram illustrating a schematic configuration of a server.

The server 20 includes a communication unit 21, a memory 22 and a control unit 23, as illustrated in FIG. 3.

The communication unit 21 includes one or more communication interfaces configured to communicate via a network including, for example, the Internet. The communication interface may be compatible with any communication standards including, but are not limited to, a wired LAN standard and a wireless LAN standard. In the present embodiment, the server 20 communicates with each of the terminal apparatuses 10 via the communication unit 21.

The memory 22 includes one or more memories. Each of the memories included in the memory 22 may function as, for example, a main memory, an auxiliary memory or a cache memory. The memory 22 stores any information used in an operation of the server 20. For example, the memory 22 may store a system program, an application program and a database.

The control unit 23 includes one or more processors, one or more programmable circuits, one or more specialized circuits, or a combination thereof. The control unit 23 controls the operation of the server 20 in its entirety.

(Operation Flow of Terminal Apparatus)

Figure 4:
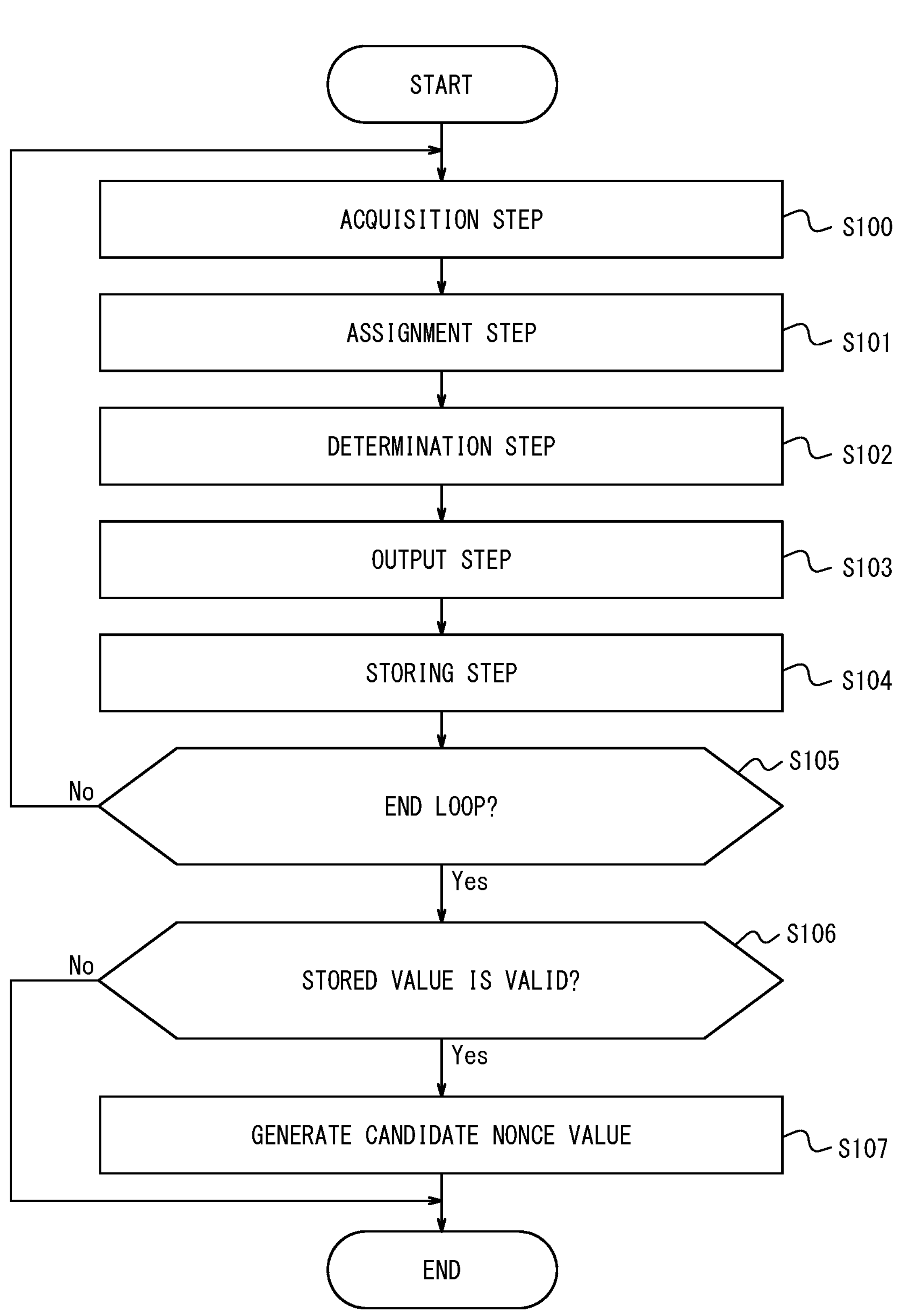
FIG. 4 is a flowchart illustrating an operation of the terminal apparatus.

An operation of each of the terminal apparatuses 10 according to the present embodiment will be described referring to FIG. 4. In essence, the operation determines a candidate nonce value based on information concealed from the user and a user operation.

Step S100: The control unit 15 of the terminal apparatus 10 acquires a plurality of candidate nonce information, each of which can be distinguished by the user. Hereinafter, this step will also be referred to as the "acquisition step".

In particular, the control unit 15 may acquire a plurality of candidate nonce information preliminarily stored in the memory 14 or may acquire a plurality of candidate nonce information from the server 20 via the communication unit 11. Although sixteen candidate nonce information are acquired as the plurality of candidate nonce information in the present embodiment, the number of the candidate nonce information to be acquired may be two or more. In the present embodiment, further, the plurality of candidate nonce information are image information of sixteen cards with respective pictures, as illustrated in FIG. 5 by way of example. However, the candidate nonce information are not limited to image information and may be any data that can be converted into binary data, including a contrast signal, a flashing light signal, an audio signal, a vibration signal, a Bluetooth® (registered trademark) signal and an infrared signal. The plurality of candidate nonce information having been output can be distinguished by the user, no matter which type of information is employed as the candidate nonce information. Hereinafter, the candidate nonce information will also be referred to simply as a "card", for simplicity of explanation.

Here, the control unit 15 assigns a different name to each of the plurality of candidate nonce information having been acquired. In the example illustrated in FIG. 5, each of the sixteen candidate nonce information is assigned a name constituted of an integer between 0 and 9 or an alphabet between a and f. For example, a name of a card with a "picture of eyeglasses" in the figure is "0". However, the name assigned to each of the candidate nonce information is not limited to a number between 0 and 9 or an alphabet between a and f but may be any data unified into 1 byte or 2 bytes.

Step S101: The control unit 15 assigns a different value to each of two or more candidate nonce information among the plurality of candidate nonce information that has been acquired. Hereinafter, this step will also be referred to as the "assignment step".

In the present embodiment, as illustrated in FIG. 5, a value representing any integer between 0 and 9 is randomly assigned to each of ten candidate nonce information among the sixteen candidate nonce information that have been acquired. For example, a value of the candidate nonce information whose name is "2" (the card with a "picture of a nut" in the figure) is "3". However, the number of candidate nonce information to which a value is assigned is not limited to ten and may be two or more. For example, a value may be assigned to all of the sixteen candidate nonce information that have been acquired. Also, the value assigned to each of the candidate nonce information is not limited to an integer between 0 and 9 and may be any real number.

The name and the value assigned to each of the candidate nonce information are concealed from the user. Therefore, the user cannot recognize the name and the value of each of the candidate nonce information.

Step S102: The control unit 15 randomly determines an order for each of the two or more candidate nonce information of step S101. Hereinafter, this step will also be referred to as a "determination step".

In the present embodiment, the order is determined for each of the ten candidate nonce information that have been assigned values, as illustrated in FIG. 5. For example, an order of the candidate nonce information whose name is "2" (the card with the "picture of the nut" in the figure) is "10".

Figure 6:
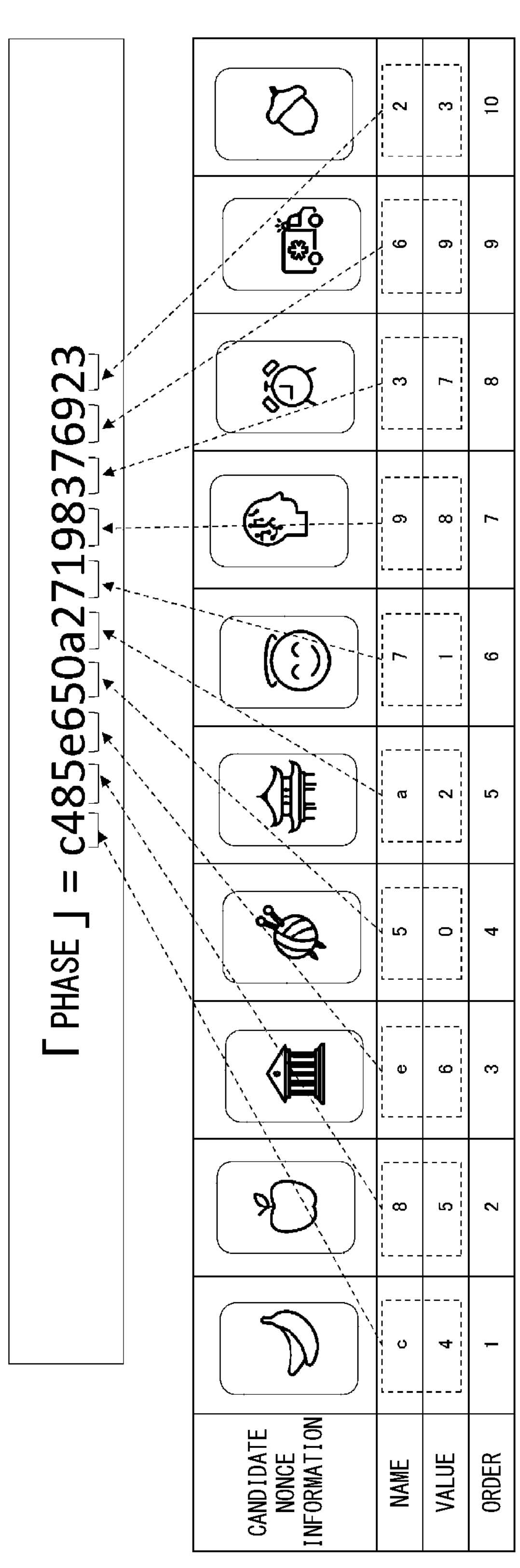
FIG. 6 is a diagram illustrating an example of a "phase" parameter.

Here, the control unit 15 stores a parameter referred to as a "phase" in the memory 14, as illustrated in FIG. 6. The phase is used to determine the validity of values stored in the storing step described later. The phase is determined based on the name and the value assigned to each of the ten candidate nonce information and the order determined for each of the ten candidate nonce information. In the present embodiment, for example, the phase is a 20-digit character string in which names and values are arranged in order from the earliest nonce candidate information. The phase is "c485e650a27198376923" in the example illustrated in FIG. 6. For example, the digits "c" and "4" located first and second from the left side of the phase respectively correspond to the name "c" and the value "4" of the candidate nonce information whose order is "1" (a card with a "picture of a banana" in the figure). Similarly, the digits "8" and "5" located third and fourth from the left side of the phase respectively correspond to the name "8" and the value "5" of the candidate nonce information whose order is "2" (a card with a "picture of an apple" in the figure).

Step S103: The control unit 15 outputs the two or more candidate nonce information of step S101 in a manner the user can recognize. Hereinafter, this step will also be referred to as the "output step".

In the present embodiment, the control unit 15 outputs ten candidate nonce information illustrated in FIG. 6 in the form of images of the cards on the display of the output unit 12. The user can recognize the candidate nonce information shown as images on the display.

Figure 7:
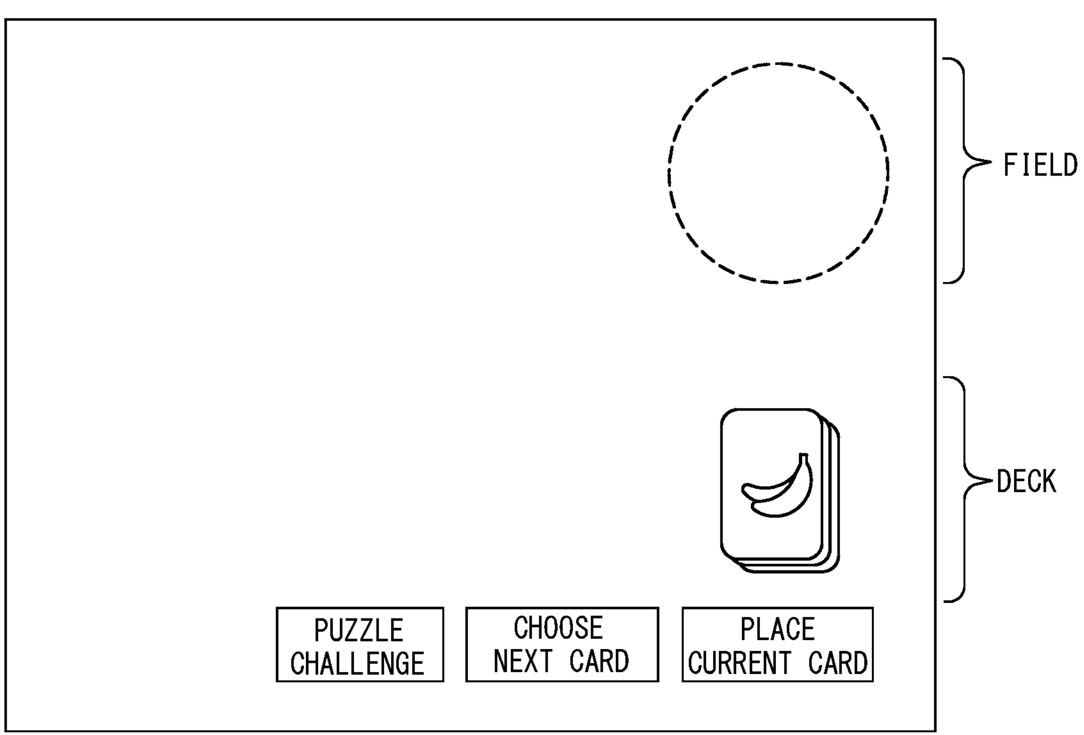
FIG. 7 is a diagram illustrating a first example screen displayed on the terminal apparatus.

In particular, the control unit 15 displays, for example, an image illustrated in FIG. 7 on the display of the output unit 12. A "deck" on the display is a stack of ten cards corresponding to the ten candidate nonce information stacked in order from one whose order is the last. In FIG. 7, the card with the "picture of the banana" (the candidate nonce information with the name "c") whose order is "1" is displayed on top of the deck.

Figure 8:
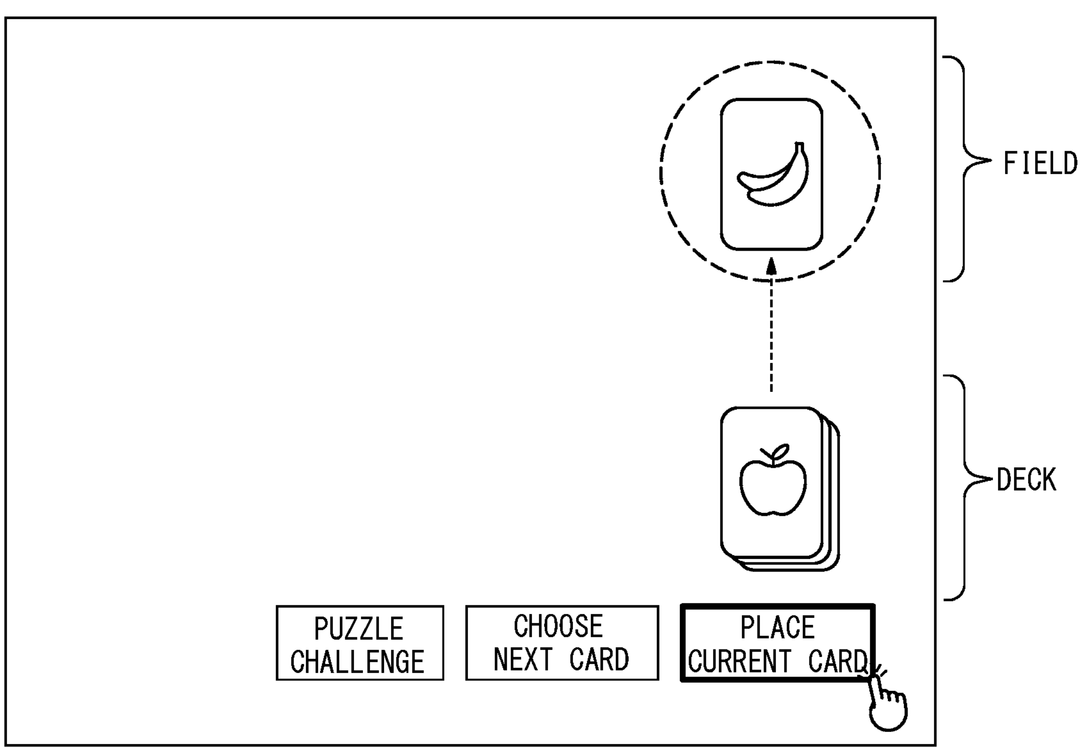
FIG. 8 is a diagram illustrating a second example screen displayed on the terminal apparatus.

The control unit 15 waits for a user operation. When the control unit 15 detects a user operation performed to a button marked by "Place current card" as illustrated in FIG. 8, the control unit 15 places the top card of the deck in a field. In FIG. 8, the card with the "picture of the banana" whose order is "1" is placed in the field. In FIG. 8, also, a next top card of the deck is the card with the "picture of the apple" whose order is "2" (candidate nonce information whose name is "8"). Every time the control unit 15 detects a user operation performed to the button marked by "Place current card", the control unit 15 returns the card in the field to the bottom of the deck and places the top card of the deck in the field. In this way, the ten cards (i.e., the two or more candidate nonce information of step S101) are placed in the field one by one in the order determined in the determination step, each time a user operation performed to the button marked by "Place current card" is detected. The last card placed in the field means a card selected from the ten cards based on the user operation. In other words, the control unit 15 allows the user to select one card from the ten cards.

Step S104: When one candidate nonce information is selected from the two or more candidate nonce information of step S101 based on a user operation, the control unit 15 stores a parameter referred to as a "selected value" for the selected one candidate nonce information (here, a card in the field) as described later in the memory 14. Hereinafter, this step will also be referred to as the "storing step".

Figure 10:
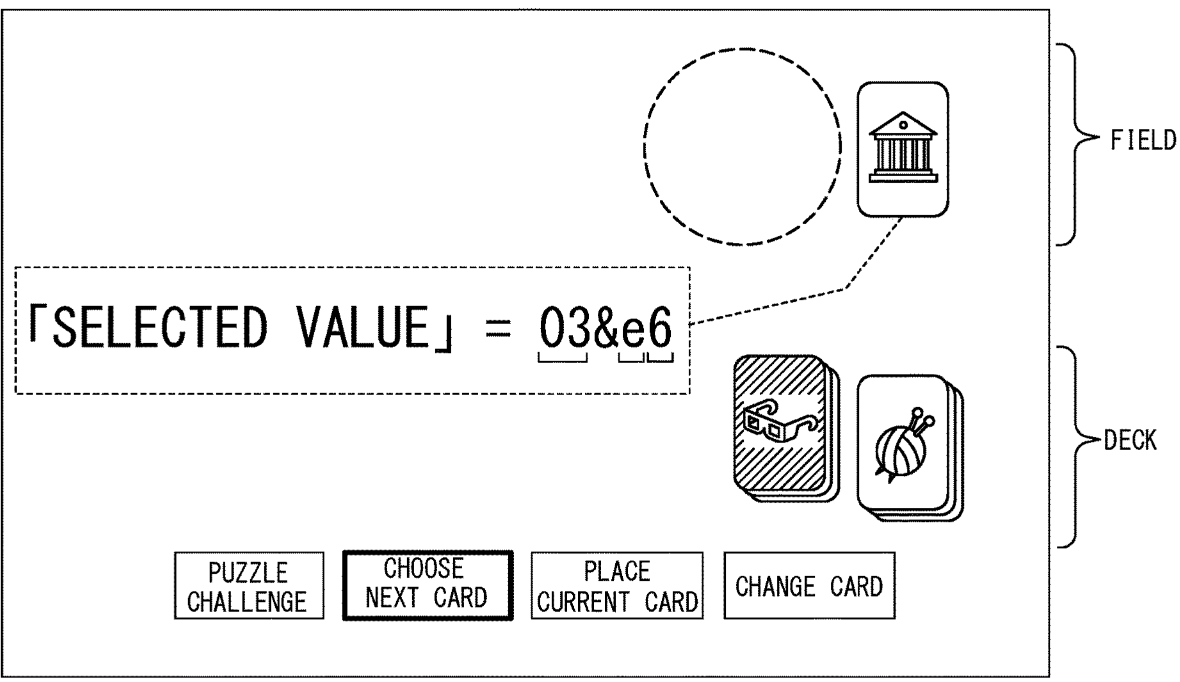
FIG. 10 is a diagram illustrating a fourth example screen displayed on the terminal apparatus.

In particular, in a case in which one card to be placed in the field is selected from the deck constituted of the ten cards based on a user operation performed to the button marked by "Place current card", the control unit 15 stores the selected value of the one card having been selected, i.e., the last card placed in the field, in the memory 14. The selected value is a parameter that includes the order, the name and the value of the card placed in the field. In FIG. 10, for example, a card with a "picture of a temple" placed in the field has an order of "3", a name of "e" and a value of "6". In this case, a selected value of this card, i.e., "03&e6", is stored. The two digits "03" located first and second from the left side of the selected value indicate the order of the card "3". The digit "e" located second from the right side of the selected value indicates the name of the card "e". The digit "6" located first from the right side of the selected value indicates the value "6" of the card. Note that, although the selected value is illustrated in the figure for illustration purpose, the selected value is not displayed on the screen and is concealed from the user. The selected value stored in the memory 14 is updated each time the card in the field changes.

Step S105: The control unit 15 determines, based on a user operation, whether to end a loop (i.e., repeated execution) of the specific process having steps S100 to S104 described above (i.e., the acquisition step, the assignment step, the determination step, the output step and the storing step). In a case in which it is determined to end the loop (Yes in step S105), the process proceeds to step S106. On the other hand, in a case in which it is determined to not end the loop (No in step S105), the process returns to step S100.

Figure 9:
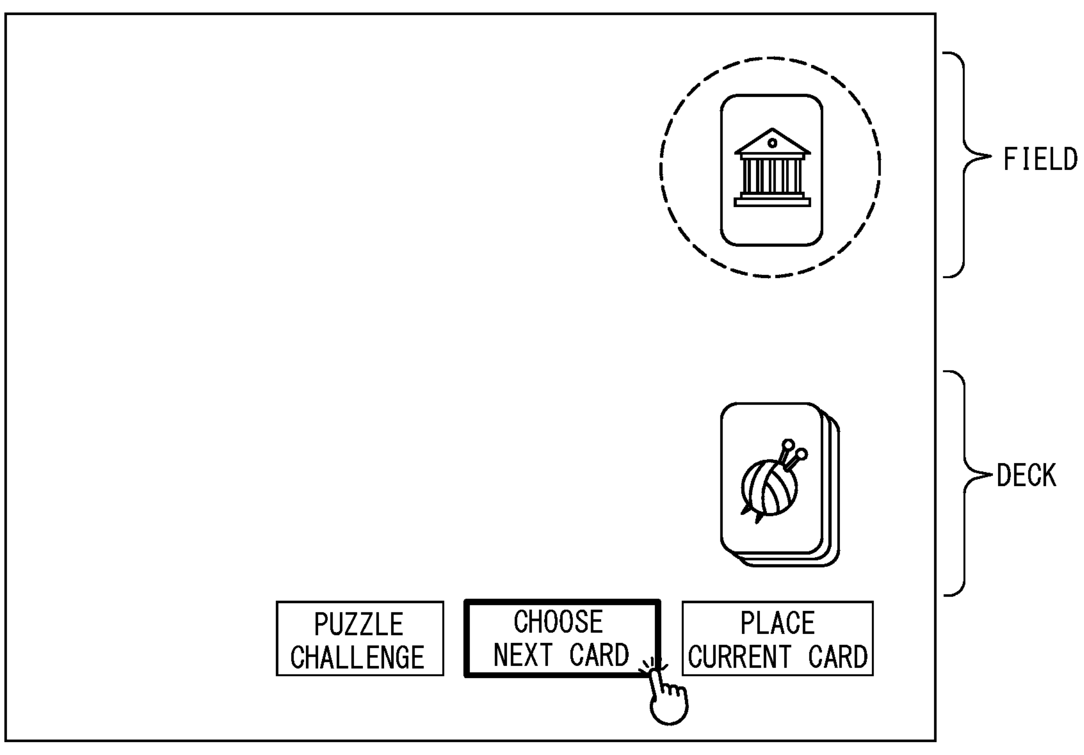
FIG. 9 is a diagram illustrating a third example screen displayed on the terminal apparatus.

In particular, the control unit 15 waits for a user operation. In a case in which the control unit 15 detects a user operation performed to, for example, a button marked by "Choose next card" as illustrated in FIG. 9, the control unit 15 determines to not end the loop. In a case in which it is determined to not end the loop, the process returns to step S100 to execute the specific process anew.

A result of the execution of the specific process is managed independently for each time the specific process is executed. For example, for each time of execution of the specific process, the field, the deck and the button marked by "Place current card" are displayed on the screen. In an example illustrated in FIG. 10, a new field, deck and button marked by "Place current card" corresponding to the specific process to be executed the second time are displayed. For example, for each time the specific process having been executed, the phase and the selected value are stored in the memory 14.

When a user operation performed to the button marked by "Change card" is detected, for example, a card in the field corresponding to the specific process having been previously executed may be changed.

On the other hand, when the control unit 15 detects a user operation performed to a button marked by "Puzzle challenge", the control unit 15 determines to end the loop.

Step S106: In a case in which it is determined to end the loop in step S105 (No in step S105), the control unit 15 determines, for each time of execution of the specific process, the validity of the value stored in the storing step, based on the value assigned to each of the two or more candidate nonce information in the assignment step, the order determined for each of the two or more candidate nonce information in the determination step, and the value and the order stored in the storing step. In a case in which the validity of the values for all the times of execution of the specific process is recognized (Yes in step S106), the process proceeds to step S107. On the other hand, in a case in which the validity of a value for at least one time of execution of the specific process is not recognized (No in step S106), the process ends.

In the present embodiment, the control unit 15 determines the validity of the value stored in the storing step, based on the phase and the selected value. As mentioned above, the phase is a parameter based on the names, values and orders of the ten cards (see FIG. 6). The selected value is a parameter that includes the name, value and order of the last card placed in the field (see FIG. 10).

A detailed description will be discussed referring to FIG. 11. FIG. 11 illustrates information stored in the memory 14 as a result of the specific process described above having been executed five times. For example, the phase is "c485e650a27198376923" and the selected value is "03&e6" for the specific process performed first time. The control unit 15 separates the selected value into a first selected value "03" and a second selected value "e6". The control unit 15 reads two digits at a time from the left side of the phase and acquires a read value of the time of execution corresponding to the first selected value. Here, since the first selected value is "03", "e6" as a third read value (i.e., fifth to sixth digits from the left side of the phase) is acquired. In a case in which the acquired read value (here, "e6") and the second selected value (here, "e6") are the same, the control unit 15 determines that the value (here, "6") stored in the storing step of the specific process executed first time is valid. On the other hand, in a case in which the acquired read value and the second selected value are different from each other, the control unit 15 determines that the value stored in the storing step of the specific process executed first time is invalid. In a similar manner, the control unit 15 determines the validity of the value stored in the storing step of the specific process executed from second time onwards. When it is determined that the values of all the times of execution of the specific process are valid, the process proceeds to step S107. This configuration can detect a fraudulent act in which, for example, a malicious user tampers with a value stored in the storing step (in this case, the first digit from the right side of the selected value).

Step S107: In a case in which it is determined in step S106 that the validity of the values of all the times of execution of the specific process is recognized (Yes in step S106), the control unit 15 generates one candidate nonce value using one or more values stored in the memory 14 as a result of the specific process having been executed one or more times. Then, the process ends.

In the present embodiment, the control unit 15 uses a value stored during the specific process executed n-th time, where n is the number of times of execution of the specific process, as a value of an n-th digit from the right side of the candidate nonce value. In the example illustrated in FIG. 11, the candidate nonce value is "33686". However, any method other than this method can be employed to generate the candidate nonce value.

As mentioned above, the terminal apparatus 10 according to the present embodiment functions as the node in the blockchain network. The terminal apparatus 10 executes the specific process that includes the acquisition step, the assignment step, the output step and the storing step, more than one time. The terminal apparatus 10 then generates one candidate nonce value using one or more values stored as a result of execution of the specific process having been executed one or more times.

This configuration determines the candidate nonce value using the value assigned to the candidate nonce information selected from the two or more candidate nonce information based on a user operation. Since the determination of the candidate nonce value requires a user operation for selecting the candidate nonce information, the hash rate of the terminal apparatus 10 is independent of computing power of the terminal apparatus 10. Thus, individuals using, for example, computers with relatively low computing power can easily participate in mining, whereby the technology related to the blockchain is improved.

Further, the value assigned to each candidate nonce information may be concealed from the user. This configuration inhibits the user from arbitrarily selecting candidate nonce information to which a desired value is assigned and, as a result, a desired candidate nonce value cannot be arbitrarily input from the terminal apparatus 10. Therefore, a fraudulent act in which, for example, a business operator quickly finds a correct nonce by using a computer with high computing power prepared separately from the terminal apparatus 10 and inputs the correct nonce from the terminal apparatus 10 can be prevented, whereby the technology related to blockchain is further improved.

It should be understood that, although the present disclosure is described above based on the drawings and the embodiment, the present disclosure can be varied or modified by a person skilled in the art based on the present disclosure. Therefore, such variations and modifications are included in the scope of the present disclosure. For example, functions included in each element or step can be rearranged without logical inconsistency, and a plurality of elements or steps can be combined together or subdivided.

In the above embodiment, for example, a mode in which the configuration and operation of the terminal apparatus 10 or the server 20 are distributed to multiple computers that can communicate with each other can also be realized.

In the above embodiment, the example in which the "phase" is a 20-digit character string constituted of names and values arranged in order from the earliest nonce candidate information and the selected value is a parameter that includes the order, name and value of the card in the field (i.e., one candidate nonce information selected based on a user operation) is described. However, an example variation in which the phase and the selected value do not include the name of the candidate nonce information can also be realized. In particular, the phase may be a 10-digit character string that includes values arranged in order starting with the earliest candidate nonce information. In FIG. 6, for example, the phase may be "4560218793". The selected value may be a parameter that includes the order and the value of the card in the field. In FIG. 10, for example, the phase may be "03&6". Even in these cases, the control unit 15 can determine the validity of the value using the same procedure as that in step S106 described above.

The blockchain can also be used for, for example, transaction management of a cryptographic asset, such as a virtual currency. However, the blockchain can be used for a variety of purposes, in addition to transaction management of the cryptographic asset. For example, the blockchain may be used for an electronic key of a locking/unlocking apparatus used for a display case or a safe or may be used to determine a winning lottery number. Note that the present disclosure is applicable to a blockchain used for any purpose.

A case in which a blockchain is used for an electronic key of a locking/unlocking apparatus will be described, by way of example. Conventional locking/unlocking apparatuses that do not use a blockchain commonly use a correct value determined by a combination of multiple digits as the electronic key. On the other hand, in a case in which a blockchain is used for the electronic key of a locking/unlocking apparatus, for example, a correct nonce in which a hash value of a newly connected block meets a criterion according to a mining difficulty can be used as an electric key. In either case, however, there is a problem that the locking/unlocking apparatus can be unrighteously unlocked if, for example, a malicious user connects his/her computer to the locking/unlocking apparatus in a wired or wireless manner and conducts a mechanical brute force attack.

Figure 12:
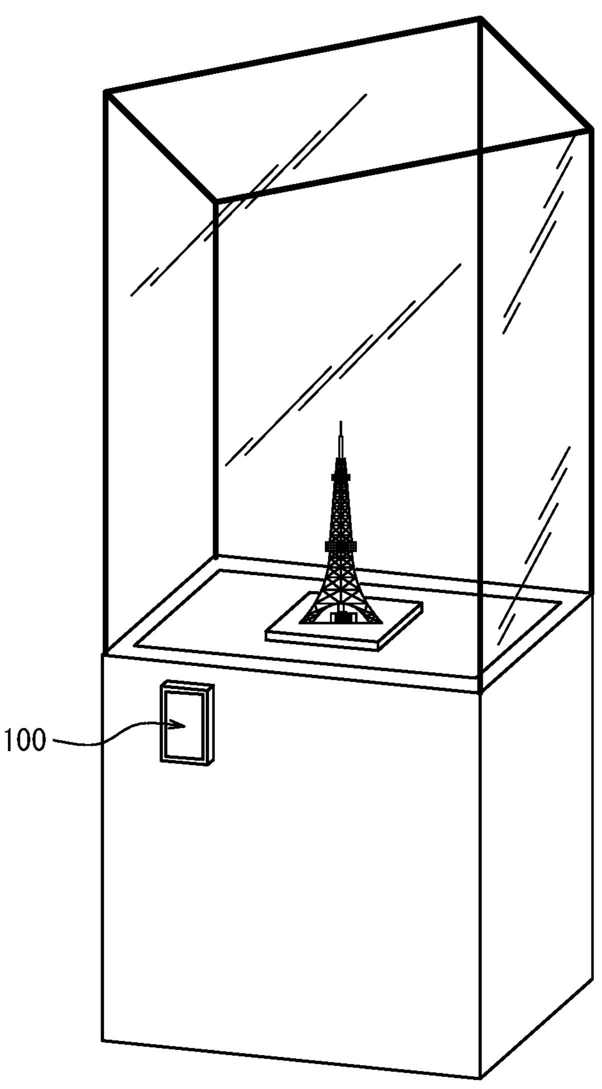
FIG. 12 is a diagram illustrating a locking/unlocking apparatus according to an example variation of the embodiment of the present disclosure.

In contrast, an example variation of the embodiment described above can reduce the possibility of unrighteous unlocking of the locking/unlocking apparatus. FIG. 12 illustrates a locking/unlocking apparatus 100 according to the example variation. The locking/unlocking apparatus 100 is provided to, for example, a display case or a safe. The locking/unlocking apparatus 100 corresponds to the terminal apparatus 10 of the embodiment described above and has the same configuration and functions as those of the terminal apparatus 10. In the example variation, the system 1 is provided with at least one locking/unlocking apparatus 100 (the terminal apparatus 10). The locking/unlocking apparatus 100 executes an unlocking process when, for example, a correct candidate nonce value is found. According to the locking/unlocking apparatus 100, a user operation to select candidate nonce information is required for the determination of the candidate nonce value, in a manner similar to the terminal apparatus 10 described above. This configuration can prevent a fraudulent act such as the mechanical brute force attack. Also, the locking/unlocking apparatus 100 conceals a value assigned to each candidate nonce information from the user, in a manner similar to the terminal apparatus 10 described above. Therefore, a fraudulent act in which, for example, a malicious user quickly finds the correct nonce (i.e., the electronic key) using a computer with high computing power prepared separately from the locking/unlocking apparatus 100 and inputs the correct nonce to the locking/unlocking apparatus 100 can be prevented. Further, the locking/unlocking apparatus 100 determines the validity of the value stored in the storing step, based on the phase and the selected value, in a manner similar to the terminal apparatus 10 described above. Therefore, a fraudulent act in which, for example, a malicious user connects his/her own computer to the locking/unlocking apparatus 100 and tampers with the value stored in the storing step can be prevented.

Further, an embodiment in which, for example, a general-purpose computer functions as the terminal apparatus 10 according to the embodiment described above can also be realized. In particular, a program describing the processing content to realize each function of the terminal apparatus 10 according to the embodiment described above is stored in a memory of the general-purpose computer to be read and executed by a processor. Therefore, the present disclosure according to the present embodiment can be realized as a program that can be executed by the processor or as a non-transitory computer readable medium storing such a program.

REFERENCE SIGNS LIST

1 System
10 Terminal apparatus
11 Communication unit
12 Output unit
13 Input unit
14 Memory
15 Control unit
20 Server
21 Communication unit
22 Memory
23 Control unit
100 Locking/unlocking apparatus

The invention claimed is:

1. A method for generating a candidate nonce value for acquiring a hash value of a block coupled to a blockchain, the method comprising:

executing one or more times, by a terminal apparatus functioning as a node in a blockchain network, a specific process including an acquisition step of acquiring a plurality of candidate nonce information, each of which is image information distinguishable by a user, an assignment step of assigning a different value to each of two or more candidate nonce information among the plurality of candidate nonce information, an output step of outputting the two or more candidate nonce information in a manner the user can recognize, and a storing step of storing a value assigned to one candidate nonce information selected from the two or more candidate nonce information based on a user operation; and generating the candidate nonce value using one or more values stored as a result of the specific process having been executed one or more times, wherein the value assigned to each of the two or more candidate nonce information in the assignment step is concealed from the user, the specific process further includes a determination step of randomly determining an order of the two or more candidate nonce information, in the output step, the two or more candidate nonce information are output one by one in the order of the two or more candidate nonce information determined in the determination step each time a user operation is detected, in the storing step, a value assigned to one candidate nonce information output last among the two or more candidate nonce information is stored as the value assigned to the selected one candidate nonce information, in the storing step, the value assigned to the selected one candidate nonce information and the order assigned to the selected one candidate nonce information in the determination step are stored, and the method further comprises determining, by the terminal apparatus, validity of the value stored in the storing step, based on the value assigned to each of the two or more candidate nonce information in the assignment step, the order of the two or more candidate nonce information determined in the determination step, and the value and the order stored in the storing step.

2. The method according to claim 1, wherein the two or more candidate nonce information is output as an image on a display in the output step.

3. The method according to claim 1, wherein the value assigned to each of the two or more candidate nonce information in the assignment step is an integer between 0 and 9, and each of the one or more values stored as a result of the specific process having been executed one or more times is used as a value of each digit of the candidate nonce value.

4. A non-transitory computer-readable medium storing a program configured to cause a computer functioning as a node in a blockchain network to execute operations, the operations comprising:

executing, one or more times, a specific process including an acquisition step of acquiring a plurality of candidate nonce information, each of which is image information distinguishable by a user, an assignment step of assigning a different value to each of two or more candidate nonce information among the plurality of candidate nonce information, an output step of outputting the two or more candidate nonce information in a manner the user can recognize, a step of causing selection of one candidate nonce information from the two or more candidate nonce information, and a storing step of storing a value assigned to the selected one candidate nonce information; and generating the candidate nonce value using one or more values stored as a result of the specific process having been executed one or more times, wherein the value assigned to each of the two or more candidate nonce information in the assignment step is concealed from the user, the specific process further includes a determination step of randomly determining an order of the two or more candidate nonce information, in the output step, the two or more candidate nonce information are output one by one in the order of the two or more candidate nonce information determined in the determination step each time a user operation is detected, in the storing step, a value assigned to one candidate nonce information output last among the two or more candidate nonce information is stored as the value assigned to the selected one candidate nonce information, in the storing step, the value assigned to the selected one candidate nonce information and the order assigned to the selected one candidate nonce information in the determination step are stored, and the operations further comprise determining validity of the value stored in the storing step, based on the value assigned to each of the two or more candidate nonce information in the assignment step, the order of the two or more candidate nonce information determined in the determination step, and the value and the order stored in the storing step.

* * * * *